(12) United States Patent
Günnewig et al.

(10) Patent No.: US 8,008,390 B2
(45) Date of Patent: Aug. 30, 2011

(54) POLYOXYMETHYLENE MOLDING COMPOSITIONS, THEIR USE, AND MOLDINGS PRODUCED THEREFROM

(75) Inventors: Thomas Günnewig, Gütersloh (DE); Klaus Kurz, Kelsterbach (DE); Guido Latz, Hattersheim (DE); Kirsten Markgraf, Weinheim (DE)

(73) Assignee: Ticona GmbH, Sulzbach (DE)

( * ) Notice: Subject to any disclaimer, the term of this patent is extended or adjusted under 35 U.S.C. 154(b) by 54 days.

(21) Appl. No.: 11/521,290

(22) Filed: Sep. 14, 2006

(65) Prior Publication Data

US 2007/0066746 A1    Mar. 22, 2007

Related U.S. Application Data

(60) Provisional application No. 60/730,802, filed on Oct. 27, 2005.

(30) Foreign Application Priority Data

Sep. 16, 2005  (DE) .......................... 10 2005 044 515

(51) Int. Cl.
*C08G 18/42* (2006.01)

(52) U.S. Cl. ........ 524/500; 525/154; 525/399; 525/410; 525/417; 523/200; 523/213; 523/216

(58) Field of Classification Search ................... 524/500; 525/398, 417, 500, 399, 410, 907, 154; 523/200, 523/213, 216
See application file for complete search history.

(56) References Cited

U.S. PATENT DOCUMENTS

| 3,642,940 A | | 2/1972 | Burg et al. | |
|---|---|---|---|---|
| 3,865,284 A | * | 2/1975 | Kazama et al. | ............... 223/68 |
| 4,169,867 A | * | 10/1979 | Burg et al. | ................. 525/417 |
| 4,493,751 A | | 1/1985 | Cherdron et al. | |
| 4,517,319 A | * | 5/1985 | Reske et al. | ................. 523/200 |
| 4,683,267 A | * | 7/1987 | Lindner et al. | ............... 525/133 |
| 4,804,716 A | * | 2/1989 | Flexman, Jr. | ................. 525/399 |
| 4,845,161 A | * | 7/1989 | Richardson | ................. 525/399 |
| 4,978,725 A | | 12/1990 | Reske et al. | |
| 5,039,741 A | | 8/1991 | Burg et al. | |
| 5,910,540 A | * | 6/1999 | Takahashi | ................. 525/92 B |
| 2005/0119396 A1 | * | 6/2005 | Papke | .......................... 524/494 |
| 2005/0261427 A1 | * | 11/2005 | Saito | ............................. 525/88 |

FOREIGN PATENT DOCUMENTS

| AU | 21487/70 | 4/1972 |
|---|---|---|
| DE | 1 193 240 | 5/1965 |
| DE | 1 931 392 | 1/1971 |
| DE | 2 051 028 | 4/1971 |
| DE | 2 215 213 | 10/1972 |
| DE | 2215213 | * 10/1972 |
| DE | 26 59 357 | 7/1978 |
| DE | 29 47 490 | 6/1981 |
| EP | 0 115 846 | 8/1984 |
| EP | 0 115 847 | 8/1984 |
| EP | 0 156 285 | 10/1985 |
| EP | 0 354 802 | 2/1990 |
| EP | 0 420 564 | 4/1991 |
| EP | 0 668 317 | 8/1995 |
| GB | 1017244 | 1/1966 |
| GB | 1335806 | 10/1973 |
| GB | 1590549 | 6/1981 |

* cited by examiner

*Primary Examiner* — Ling-Siu Choi
*Assistant Examiner* — Bijan Ahvazi
(74) *Attorney, Agent, or Firm* — Dority & Manning, P.A.

(57) ABSTRACT

Polyoxymethylene molding compositions, their use, and moldings produced therefrom
A ground molding composition is described, comprising
 a) a compounded material composed of
  i) at least one polyoxymethylene homo- and/or copolymer,
  ii) at least one impact modifier, and
  iii) optionally other conventional additives, which
 b) has been milled to give a powder at least 90% by weight of whose particles have a grain size of <600 μm and a median grain size ($D_{50}$) of from 100 to 500 μm.
These molding compositions can be processed to give moldings, in particular via rotomolding.

14 Claims, No Drawings

POLYOXYMETHYLENE MOLDING COMPOSITIONS, THEIR USE, AND MOLDINGS PRODUCED THEREFROM

The present invention relates to novel polyoxymethylene molding compositions with good processing properties for rotomolding, and also to their use, and to the moldings obtainable therewith.

Rotomolding is a processing method which can produce seamless hollow products with high complexity. Because of the specific requirements of this processing method, the materials mainly used currently are polyethylene molding compositions.

It is known in principle that polyoxymethylene molding compositions (POM molding compositions) can be used in rotomolding.

By way of example, J. M. McDonagh in SPE Journal, vol. 25, Jul. 1969, pp. 24-26 describe the rotomolding of polyoxymethylene copolymers.

DE-A-2 215 213 discloses a process for production of hollow products from polyoxymethylene copolymers via rotomolding. Here, the copolymers are precipitated from a solution in the form of particles whose size is at least 0.25 mm, these are mechanically mixed with stabilizers, and the resultant uniform mixture is processed via rotomolding. Possible stabilizers described, as also used in other polyoxymethylene molding compositions, are phenolic antioxidants, and nitrogen-containing stabilizers, and metal salts of alcohols and of organic acids.

When standard commercially available polyoxymethylene molding compositions are used, problems can occur during processing by rotomolding, since these materials are relatively brittle. For the purposes of this invention, standard polyoxymethylene moldings compositions are molding compositions which, alongside polyoxymethylene, comprise only a very small proportion (at most 2% by weight) of additives, such as UV stabilizers, antioxidants, lubricants, nucleating agents, or acid scavengers or formaldehyde scavengers. When moldings manufactured via rotomolding from standard polyoxymethylene molding compositions are demolded from the rotomolding mold the result is therefore often breakage of the moldings. Furthermore, the impact resistance of these moldings does not always meet requirements.

It is therefore an object of the present invention to provide suitable POM molding compositions for avoidance of the problems described above during rotomolding.

Surprisingly, it has been found that ground POM molding compositions with selected grain size distribution which comprise impact modifiers, in particular polyurethanes and/or polyester elastomers, can be processed by rotomolding to give moldings, in particular to give moldings with smooth surfaces, whose impact resistance meets requirements.

With the aid of the present invention it is possible to produce attractive smooth-surface rotomolded POM moldings and attractive smooth-surface hollow POM products, and also to produce hollow products whose walls are composed of layers of different materials, e.g. an external layer composed of polyethylene and an internal layer composed of POM. Furthermore, the molding composition performs well in flowing around inserts introduced into the rotomolding mold during the molding process and in integrating them into the hollow product.

The present invention therefore provides ground molding compositions comprising
 a) a compounded material composed of
  i) at least one polyoxymethylene homo- and/or copolymer,
  ii) at least one impact modifier, and
  iii) optionally other conventional additives, which
 b) has been milled to give a powder at least 90% by weight, preferably at least 95%, particularly preferably at least 97%, of whose particles have a grain size of <600 μm and a median grain size ($D_{50}$) of from 100 to 500 μm.

The $D_{50}$ value of the inventive molding compositions is preferably from 150 to 400 μm, particularly preferably from 200 to 350 μm.

Component i) of the inventive ground molding compositions is provided by polyoxymethylene homo- or copolymers.

The polyoxymethylenes, as described by way of example in DE-A-29 47 490, are generally unbranched linear polymers which generally contain at least 80%, preferably at least 90%, of oxymethylene units (—$CH_2$—O—). The term polyoxymethylenes here encompasses both homopolymers of formaldehyde or of its cyclic oligomers, such as trioxane or tetroxane, and corresponding copolymers.

Homopolymers of formaldehyde or of trioxane are polymers whose hydroxy end groups have been chemically stabilized in a known manner with respect to degradation, e.g. via esterification or via etherification. Copolymers are polymers composed of formaldehyde or of its cyclic oligomers, in particular trioxane, and of cyclic ethers, of cyclic acetals, and/or of linear polyacetals.

These POM homo- or copolymers are known per se to the person skilled in the art and are described in the literature.

Very generally, these polymers have at least 50 mol % of —$CH_2$—O— repeat units in the main polymer chain. The homopolymers are generally prepared via polymerization of formaldehyde or trioxane, preferably in the presence of suitable catalysts.

POM copolymers are preferred in the inventive molding compositions, particularly those which also contain, besides the —$CH_2$—O— repeat units, up to 50 mol %, preferably from 0.1 to 20 mol %, and in particular from 0.5 to 10 mol %, of

repeat units, where $R^1$ is a saturated or ethylenically unsaturated alkylene group having at least two carbon atoms, or a cycloalkylene group, which, if appropriate, has sulfur atoms or preferably oxygen atoms in the chain, and which, if appropriate, bears one or more substituents selected from the group consisting of alkyl, cycloalkyl, aryl, aralkyl, heteroaryl, halogen, or alkoxy.

$R^1$ is preferably a $C_2$-$C_4$-alkylene group which, if appropriate, has one or more substituents which are $C_1$-$C_4$-alkyl groups, or are $C_1$-$C_4$-alkoxy groups, and/or are halogen atoms, preferably chlorine atoms, or a group of the formula —(($C_nH_{2n}$)—O—)$_m$—, in which n is a whole number from 2 to 4 and m is 1 or 2.

These groups can advantageously be introduced into the copolymers via ring-opening of cyclic ethers and/or acetals.

Preferred cyclic ethers or acetals are those of the formula

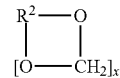

in which x is 0 or 1 and $R^2$ is a $C_2$-$C_4$-alkylene group or an alkyleneoxyalkylene unit which, if appropriate, have one or more substituents which are $C_1$-$C_4$-alkyl groups, or which are $C_1$-$C_4$-alkoxy groups, and/or which are halogen atoms, preferably chlorine atoms.

Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers.

It is particularly advantageous to use copolymers composed of from 99.5 to 95 mol % of trioxane and of from 0.5 to 5 mol % of one of the above-mentioned comonomers.

Other polyoxymethylenes likewise suitable are oxymethylene terpolymers which by way of example are prepared via reaction of trioxane and of one of the cyclic ethers or acetals described above, and using a third monomer, preferably a bifunctional compound of the formula

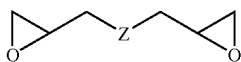

where Z is a chemical bond, —O—, or —O—$R^3$—O— ($R^3$=$C_2$-$C_8$-alkylene or $C_2$-$C_8$-cycloalkylene).

Preferred monomers of this type are ethylene diglycide, diglycidyl ether and diethers composed of glycidyl compounds and formaldehyde in a molar ratio of 2:1, and also diethers composed of 2 mol of glycidyl compound and 1 mol of an aliphatic diol having from 2 to 8 carbon atoms, examples being the diglycidyl ether of ethylene glycol, 1,4-butanediol, 1,3-butanediol, 1,3-cyclobutanediol, 1,2-propanediol, and 1,4-cyclohexanediol, and also diglycerol diformal, to mention just a few examples.

Processes for preparation of the POM homo- and copolymers described above are known to the person skilled in the art and are described in the literature.

The melting points of the preferred POM copolymers are at least 150° C., and their molecular weights (weight-average) $M_w$ are in the range from 5000 to 200 000, preferably from 7000 to 150 000.

End-group-stabilized POM polymers whose chain ends have carbon-carbon bonds, or which have methoxy end groups, are particularly preferred as component i).

The melt index (MVR value 190/2.16) of POM polymers used as component i) is generally from 2 to 50 cm³/10 min (ISO 1133).

Component ii) of the inventive POM molding compositions is provided by impact modifiers. Examples of suitable impact modifiers are polyurethanes, grafted polymers containing not only non-polar but also polar polymer segments, for example styrene-acrylonitrile copolymer grafted onto poly-ethylene, an example being LDPE-SAN, as described in EP-A-354,802 and in EP-A420,564, or polymers having a core-shell structure which have an elastomeric core based on polybutadiene and a hard shell, as described in EP-A-156,285 and EP-A-668,317, two-phase mixtures composed of polybutadiene and styrene/acrylonitrile (ABS), as described in DE-A-1 931 392, polycarbonate (PC), styrene/acrylonitrile copolymer (SAN), or compounded acrylate/styrenelacrylonitrile copolymer (ASA), modified polysiloxane and, respectively, silicone rubbers, as described in DE-A-2 659 357, or other thermoplastic elastomers, such as polyester elastomers.

Preferred impact-modifiers are polyurethanes and/or polyester elastomers.

Polyurethanes and their use in POM molding compositions are known, for example, from EP 0 115 846 A2 and EP 0 115 847 A2.

Inventive polyurethanes are particularly preferably thermoplastic. Polyurethanes of this type are described by way of example in DE-C 1 193 240 or DE-A-2 051 028. They are known to be prepared via polyaddition from polyisocyanates, in particular from diisocyanates, from polyesters and/or polyethers, or from polyesteramides or other suitable hydroxy or amino compounds, e.g. hydroxylated polybutadiene, and, if appropriate, from chain extenders, such as low-molecular-weight polyols, in particular diols, or from polyamines, in particular diamines, or water.

Examples of suitable diisocyanates are diisocyantes of the formula

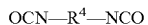

where $R^4$ can be a divalent, straight-chain or branched aliphatic radical having from 1 to 20, preferably from 2 to 12, carbon atoms, or a divalent cycloaliphatic radical having from 4 to 20, preferably from 6 to 15, carbon atoms, or a divalent, substituted or unsubstituted aromatic radical having from 6 to 25, preferably from 6 to 15, carbon atoms.

An example of divalent aliphatic radical that can be used is the alkylidene radical —$(CH_2)_n$—, where n is preferably from 2 to 12. Examples here are the ethylidene, propylidene, pentamethylene, or hexamethylene radical, or else the 2-methylpentamethylene, 2,2,4-trimethylhexamethylene, or 2,4,4-tri-methylhexamethylene radical. Diisocyanates of this type, which are particularly preferred, are hexamethylene diisocyanate, and also trimethyl-hexamethylene 2,2,4- and 2,4,4-diisocyanate.

If $R^4$ in the above formula is a cycloaliphatic radical, this is preferably the unsubstituted or substituted cyclohexane radical. Examples of diiso-cyanates of this type are 1,2- or 1,4-bis(isocyanatomethyl)cyclohexane or isophorone diisocyanate.

$R^4$ in the above formula can also be a combination of divalent open-chain aliphatic and cycloaliphatic radicals and by way of example can be

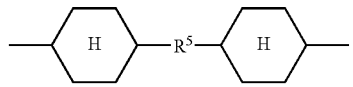

where $R^5$ is a saturated straight-chain or branched aliphatic radical having from 1 to 8, preferably from 1 to 3, carbon atoms. The two rings here are preferably unsubstituted cyclohexane, while $R^5$ is preferably the methylene, ethylene, or dimethylmethylene group.

$R^4$ in the above formula can also be a divalent aromatic radical. Preference is given to the toluidene, diphenylmethylene, phenylene, or naphthylene radical. Examples of corresponding diisocyanates are: toluene 2,4-diiso-cyanate, toluene 2,6-diisocyanate, diphenylmethane 4,4'-diisocyanate, 3,3'-dimethyidiphenylmethane 4,4'-diisocyanate, 3,3,'-dimethyidiphenylene 4,4'-diisocyanate, m-phenylene diisocyanate, p-phenylene diisocyanate, o-phenylene diisocyanate, the isomeric chlorophenylene toluene 2,4-diisocyanate, 3,3'-dichlorodiphenyl 4,4'-diisocyanate, 4-chloro-phenylene 1,3-diisocyanate, naphthalene 1,5-diisocyanate, and naphthalene 1,4-diisocyanate.

The diisocyanates of the formula OCN—$R^4$—NCO can also be used in oligomeric form, for example in dimeric or trimeric form. Instead of the polyisocyanates, it is also known to be possible to use capped poly-isocyanates obtained from the isocyanates mentioned via, for example, addition reactions of phenol or caprolactam.

Aliphatic polyhydroxy compounds that can be used are polyethers, such as polyethylene glycol ethers, polypropylene glycol ethers, and polybutylene glycol ethers, poly-1,4-butanediol ethers, or mixed polyethers composed of ethylene oxide and propylene oxide. Other compounds that can be used for this purpose are polyesteramides, polyacetals, and preferably aliphatic polyesters, all of these compounds having free OH end groups.

The aliphatic polyesters are in essence non-crosslinked polyesters whose molecular weights are from 500 to 10 000, preferably from 500 to 5000. Their acid component derives from unbranched and/or branched aliphatic dicarboxylic acids, e.g. dicarboxylic acids of the formula $$HOOC-(CH_2)_n-COOH$$

where n=from 0 to 20, preferably from 4 to 10, in particular adipic acid and sebacic acid. Cycloaliphatic dicarboxylic acids can also be used for this purpose, examples being cyclohexanedicarboxylic acids, and also mixtures with the above aliphatic dicarboxylic acids.

An alcohol component that can be used for these polyesters is especially unbranched or branched aliphatic primary diols, e.g. diols of the formula $$HO-(CH_2)_m-OH$$

where m=from 2 to 12, preferably from 2 to 6. Mention may be made here particularly of ethylene glycol, 1,4-butanediol, 1,6-hexanediol, and 2,2-di-methyl-1,3-propanediol, and also diethylene glycol. Other suitable compounds here are cycloaliphatic diols, such as bis(hydroxymethyl)-cyclohexanes, or mixtures with the aliphatic diols.

In each case, the polyesters can be prepared from one dicarboxylic acid and from one diol, or else from mixtures of two or more dicarboxylic acids and/or two or more diols.

Chain extenders that can be used in the preparation of the polyurethanes are especially low-molecular-weight polyols, in particular diols, and also polyamines, in particular diamines, or else water.

The polyurethanes used according to the invention are preferably thermoplastic and with this are preferably in essence non-crosslinked, i.e. capable of repeated melting without significant evidence of decomposition. The tensile strain at break values of the polyurethanes are preferably from 300 to 1500%, particularly preferably from 500 to 1000%, while the Shore A hardness is not above 95, preferably from 50 to 90, in particular from 65 to 85, and the glass transition temperature is preferably not higher than 0° C., particularly preferably not higher than −10° C.

If component ii) of the inventive POM molding composition comprises polyester elastomers as impact modifiers, it is preferable to use thermo-plastic multiblock copolymers whose structure is composed of stiff polyester segments and of flexible long-chain polyether or polyester segments (TPE-E).

TPE-E are known per se. Examples of these are described in Handbook of Thermoplastic Polyesters, vol. 1, pp. 581-3, Wiley-VCH, Weinheim, 2002.

Preferred thermoplastic polyester elastomers are copolyesters containing repeat structural units of the formulae below linked to one another via ester bonds $$-O-G-O-CO-R^6-CO-O-D-O-CO-R^7-CO$$

where G is a divalent radical of a long-chain glycol after removal of the hydroxy groups,
D is a divalent radical of an aliphatic glycol whose molecular weight is less than 250 after removal of the hydroxy groups, $R^6$ and $R^7$, independently of one another, are a divalent radical of a dicarboxylic acid after removal of the carboxy groups, with the proviso that at least 70 mol % of the radicals $R^7$ are divalent aromatic radicals and that from 15 to 95% by weight, based on the copolyester, are repeat structural units of the formula $-O-D-O-CO-R^7-CO$.

The preferred thermoplastic copolyester elastomers are in essence composed of the repeat long-chain ester units described above of the formula $-O-G-O-CO-R^6-CO$ and of repeat short-chain ester units of the formula $-O-D-O-CO-R^7-CO$.

The expression "long-chain ester units" describes a reaction product of a long-chain glycol with a dicarboxylic acid. Suitable long-chain glycols for preparation of the copolyesters have a number-average molar mass of from 400 to 4000 g/mol and exhibit a melting point (DSC) below 55° C. Preferred long-chain glycols for preparation of these copolyester elastomers are poly(alkylene oxide) glycols in which the alkylene moiety has from 2 to 8 carbon atoms, examples being poly(ethylene oxide) glycol, poly(propylene 1,2- and 1,3-oxide) glycol, poly(tetramethylene oxide) glycol, poly(pentamethylene oxide) glycol, poly(octamethylene oxide) glycol, and poly(butylene 1,2-oxide) glycol; random or block copolymers of ethylene oxide and propylene 1,2-oxide; and also polyformals obtainable via reaction of formaldehyde with glycols, such as pentamethylene glycol, or with mixtures of glycols, for example mixtures composed of tetramethylene glycol and pentamethylene glycol. Other preferred long-chain glycols are aliphatic polyesters, e.g. polybutylene adipate, poly-butylene succinate, or polycaprolactone. Other suitable long-chain polymeric glycols derived from polybutadiene glycols or from polyisoprene glycols, or else from copolymers composed of these units and the corres-ponding hydrogenated derivatives of these glycols.

Long-chain glycols whose use is particularly preferred are poly(tetramethylene oxide) glycol whose number-average molecular weight is from 600 to 2000 and ethylene-oxide-capped poly(propylene oxide) glycol whose number-average molecular weight is from 1500 to 5000, comprising from 15% to 40% of ethylene oxide.

The short-chain ester units are reaction products of low-molecular-weight diols with a dicarboxylic acid or with a mixture of dicarboxylic acids.

At least 70 mol % of the short-chain ester units have radicals $R^7$ derived from aromatic dicarboxylic acids, such as isophthalic acid or in particular terephthalic acid.

Low-molecular-weight diols for reaction to give short-chain ester units are aliphatic diols whose molecular weights are below 250. The expression "aliphatic diols" also encompasses cycloaliphatic diols.

It is preferable to use diols having from 2 to 15 carbon atoms. Examples of preferred diols are ethylene glycol, propylene glycol, tetramethylene glycol, pentamethylene glycol, 2,2-dimethyltrimethylene glycol, hexamethylene glycol, and decamethylene glycol, dihydroxycyclohexane, cyclohexane-dimethanol, and mixtures of these.

Instead of the diols, it is also possible to use their ester-forming derivatives, such as ethylene oxide or ethylene carbonate.

Dicarboxylic acids which can be used for the preparation of the long-chain and short-chain ester units described are aliphatic, cycloaliphatic, and/or aromatic dicarboxylic acids of low-molecular weight, usually below 300.

For the purposes of the previous paragraph, the expression "dicarboxylic acids" also encompasses their polyester-forming derivaffves, such as dicarbonyl halides, dicarboxylic esters, or dicarboxylic anhydrides.

The expression "aliphatic dicarboxylic acids", where these can be used for preparation of the long-chain and short-chain ester units described, means carboxylic acids which have two carboxy groups bonded to different carbon atoms of an aliphatic or cycloaliphatic hydrocarbon. Alongside ethylenically unsaturated dicarboxylic acids, such as maleic acid, saturated dicarboxylic acids are in particular used.

The expression "aromatic dicarboxylic acids", where these can be used for preparation of the long-chain and short-chain ester units described, means carboxylic acids which have two carboxy groups bonded to different carbon atoms of a benzene ring, which can be part of a ring system. The carboxy groups may also be groups bonded to carbon atoms of different rings. There may be two or more rings and annelated to each other or linked to one another via bridging groups, such as a direct carbon-carbon bond, —O—, —CH$_2$—, or —SO$_2$—.

Examples of these aliphatic or cycloaliphatic dicarboxylic acids which can be used for preparation of the polyester elastomers to be used according to the invention are sebacic acid, 1,3-cyclohexanedicarboxylic acid, 1,4-cyclo-hexanedicarboxylic acid, adipic acid, glutaric acid, succinic acid, carbonic acid, oxalic acid, azelaic acid, diethyldicarboxylic acid, 2-ethylsuberic acid, 2,2,3,3-tetramethylsuccinic acid, cyclopentanedicarboxylic acid, decahydro-1,5-naphthalenedicarboxylic acid, 4,4'-bicyclohexyldicarboxylic acid, decahydro-2,6-naphthalenedicarboxylic acid, 4,4'-methylenebis-(cyclohexanecarboxylic acid), 3,4-furandicarboxylic acid, and 1,1-cyclo-butanedicarboxylic acid.

Preferred aliphatic carboxylic acids are cyclohexanedicarboxylic acid and adipic acid.

These aliphatic dicarboxylic acids are preferably used together with isophthalic acid and very particularly preferably together with terephthalic acid.

Examples of aromatic dicarboxylic acids which can be used for preparation of the polyester elastomers to be used according to the invention are phthalic acid, isophthalic acid, terephthalic acid, dibenzoic acid, substituted dicarboxy compounds having two benzene nuclei, e.g. bis(p-carboxyphenyl) methane, p-oxy(p-carboxyphenyl)benzoic acid, ethylenebis-(p-oxybenzoic acid), 1,5-naphthalenedicarboxylic acid, 2,6-naphthalene-dicarboxylic acid, 2,7-naphthalenedicarboxylic acid, phenanthrene-dicarboxylic acid, anthracenedicarboxylic acid, 4,4'-sulfonyidibenzoic acid, and $C_{1-12}$-alkyl-substituted or otherwise substituted derivatives thereof, e.g. halo-, alkoxy-, and aryl-substituted derivatives. It is also possible to use hydroxycarboxylic acids, such as p(β-hydroxyethoxy) benzoic acid.

Terephthalic acid is preferably used as aromatic dicarboxylic acid.

The polyester elastomers used according to the invention preferably have, in their short-chain ester units, at least 70 mol % of repeat structural units which derive from ethylene terephthalate units and/or from 1,4-butylene terephthalate units.

Very particularly preferably used polyester elastomers are polyether esters based on polybutylene terephthalate as stiff segment and polytetra-methylene oxide as flexible segment.

The hardness range of the polyester elastomers used according to the invention is preferably from about Shore A 65 to about Shore D 77. The hardness here is also a measure of the proportion of the stiff polyester segments in relation to the flexible long-chain polyester segments.

The melt index of the polyester elastomers is measured at various temperatures, as a function of the melting behavior of the stiff polyester segments. It is also a measure of the extent of the addition reaction (molecular weight of the entire chains).

The inventive molding composition can comprise one or more of the impact modifiers (component ii) mentioned.

An optionally present component iii) mentioned for the inventive POM molding compositions is provided by additives known per se which are usually used in molding compositions of this type in order to ease their processing or in order to give a desired property to the molding composition.

Examples of these are processing aids, such as antioxidants, acid scavengers, e.g. nitrogen-containing compounds, formaldehyde scavengers, e.g. nitrogen-containing compounds, UV stabilizers, coupling agents, lubricants, nucleating agents or mold-release agents, fillers, reinforcing materials, antistatic agents, or additives which give a desired property to the molding composition, e.g. dyes and/or pigments, and/or impact modifiers other than those mentioned as component ii), and/or the additives that infer electrical conductivity, e.g. carbon black or metal particles, or else a mixture of these additives, but without any restriction of scope to the examples mentioned.

Examples of antioxidants are phenolic compounds, such as N,N'-bis-3-(3',5'-di-tert-butyl-4'-hydroxyphenyl)propionylhydrazine, 1,6-hexanediol bis-3-(3',5'-di-tert-butyl-4'-hydroxyphenyl)propionate, 3,6-dioxaoctane-1,8-diol bis-3-(3'-tert-butyl-4'-hydroxy-5'-methylphenyl)propionate, N,N'-hexa-methylenebis-3-(3',5'-di-tert-butyl-4'-hydroxyphenyl) propionamide, tetrakis-[methylene 3-(3',5'-di-tert-butyl-4'-hydroxyphenyl)propionate]methane, 1,3,5-trimethyl-2,4,6-tris(3',5'-di-tert-butyl-4'-hydroxybenzyl)benzene.

Examples of lubricants are esters and amides of a long-chain aliphatic carboxylic acid and of an aliphatic alcohol, or polyethylene waxes, preferably oxidized polyethylene waxes.

Examples of fillers are glass beads, calcium carbonate, talc, wollastonite, or silicon dioxide.

Examples of reinforcing materials are carbon fibers, high-strength synthetic fibers, such as aramid fibers, or glass fibers.

Examples of additives which give a desired property to the molding composition are ultrahigh-molecular-weight polyethylene (UHMWPE), polyetetrafluoroethylene (PTFE), and graft copolymers, which are a product of a graft reaction, composed of an olefin polymer and of an acrylonitrile/styrene copolymer.

Examples of nucleating agents are talc and branched or crosslinked polyoxymethylenes.

Examples of acid scavengers or formaldehyde scavengers are nitrogen-containing compounds which can chemically bind formaldehyde liberated in a chemical reaction and thus prevent its possible oxidation to give formic acid, and/or compounds acting as proton acceptors. Examples of these compounds are urea and its substitution products, condensates of urea derivatives, amides, including polyamides, e.g. low-melting-point poly-amides, or high-melting-point polyamides dispersed on or in a carrier, and also melamine-formaldehyde condensates, guanamides, and amines. It is also possible to use polyhydroxy compounds, or else carboxylic salts and alkaline earth metal oxides.

The inventive molding compositions usually comprise from 60 to 99.99% by weight, preferably from 80 to 99.8% by weight, of component i, from 0.01 to 30% by weight, preferably from 0.2 to 20% by weight, particularly preferably from 0.5 to 12% by weight, of component ii, and from 0 to 30% by weight, preferably from 0.3 to 25% by weight, of component iii, each of these data being based on the entire composition.

The melt index of the inventive molding compositions is moreover from 1.5 to 13 cm$^3$/10 min (MVR 190/2.16 to ISO 1133).

For the inventive molding composition it is significant that it takes the form of a powder at least 90% by weight, preferably at least 95% by weight, particularly preferably at least 97% by weight, of whose particles have a grain size of <600 μm and a median grain size ($D_{50}$) of from 100 to 500 μm.

Preferred median grain sizes $D_{50}$ are in the range from 150 to 400 μm, in particular from 200 to 350 μm.

The milling can take place in apparatus known per se. Examples of these are ball mills, mills with grinding stones, roll mills, tubular mills, cone mills, hammer mills, chopper mills, fine-product impact mills, and opposed-jet mills.

The inventive compounded material is prepared in a simple manner via mixing of the constituents at an elevated temperature at which the polymer components melt but do not decompose, i.e. generally at from 160 to 250° C., preferably at from 180 to 2400° C., in assemblies providing good mixing, e.g. Brabenders, extruders, and preferably twin-screw extruders, or on mixing rolls. It is, naturally, also possible to begin by mixing the components mechanically at room temperature and then melting them for full homogenization. It has been found here that purely mechanical mixing without melting does not give a mixture in which the distribution of the constituents is desirably homogeneous.

The inventive molding compositions can be processed in a wide variety of ways to give moldings. Examples of these are the processes known per se for POM molding compositions: extrusion, injection molding, and in particular rotomolding.

The invention therefore also provides a process for production and moldings from the inventive molding composition, which comprises grinding the molding composition to give a powder at least 90% by weight of whose particles have a grain size <600 μm and a median grain size ($D_{50}$) of from 100 to 500 μm, and then processing it via rotomolding.

The invention therefore also provides the moldings obtainable via the processing of the ground molding compositions defined above.

The invention also provides the use of the molding compositions defined above for rotomolding.

Processing by rotomolding typically takes place at oven temperatures of from 100 to 300° C., preferably from 200 to 270° C., and the processing time is typically from 1 to 60 minutes, preferably from 20 to 30 minutes.

It has been found that moldings produced from the inventive, ground molding compositions via rotomolding give better demolding from the rotomolding mold, and have better mechanical properties, i.e. were less brittle than moldings produced from molding compositions which comprised no impact modifiers. Hollow products produced from molding compositions which comprised thermoplastic polyurethane and thermoplastic polyester elastomer as impact modifier moreover had surprisingly smooth internal surfaces. Furthermore, the inventive molding compositions permitted production of hollow products whose walls are composed of layers of different materials, e.g. an external layer composed of polyethylene and an internal layer composed of POM. The inventive molding composition moreover is effective in flowing around inserts introduced into the rotomolding mold during the rotomolding process and integrating them into the hollow product.

The examples below illustrate the invention but do not restrict the same. Unless otherwise stated, amounts stated in the examples are in parts by weight.

EXAMPLES

Data concerning the constitution of the molding compositions, and also data concerning the production of the test specimens, can be found in the sections below. The table collates the experimental result, and also the sizes utilized in the examples.

Grinding: All of the grinding experiments were carried out in a baffle-plate impact mill (manufacturer: Pallmann; PP8).

The following particle size distributions and powder-flow times to ASTM D1895-69 were found here:

Method: Alpine air-jet sieve

Amount applied: 10 g

Sieve time: 5 min

Negative gauge pressure: from 1500 to 2500 Pa

| Sieve residue (%) | | | | | Powder-flow | |
|---|---|---|---|---|---|---|
| >600 μm | >400 μm | >250 μm | >100 μm | >63 μm | time (s/90 g) | $D_{50}$ (μm)*[2] |
| 2.2-2.9 | 26.1-28.2 | 52-54 | 88-90 | 95.9-96.2 | 10.98-11.15 | 260-262 |

*[2]Value has been interpolated

Processing of Molding Compositions:

2.3 kg of ground product were processed via rotomolding in a Ferry Shuttle 3400 rotomolding machine at an oven temperature of from 230 to 260° C., using a cylindrical mold (dimensions: diameter: 430 mm; height: 300 mm), giving hollow products with about 4 mm wall thickness. For the mechanical tests on the hollow products, for tensile tests, tensile specimens were milled from these, and multipurpose test specimens were sawn from these.

Standard test specimens were produced on a Krauss Maffei 125/290C2 injection-molding machine, at 205° C. melt temperature and 90° C. mold temperature with 900 bar hold pressure.

Molding composition 1 (inventive): Composed of a ground compounded material which comprised (i) polyoxymethylene copolymer whose melt volume rate (MVR) is about 8 cm$^3$/10 min to ISO 1133, (ii) 9% of poly-urethane which is composed of aromatic diisocyanate and of aliphatic polyester having free OH end groups and whose tensile strain at break is 600% and whose Shore A hardness is 83, and also (iii) 0.35% of other conventional additives.

Molding composition 2 (for comparison): Composed of (i) ground polyoxymethylene copolymer whose melt volume rate (MVR) is about 8 cm$^3$/10 min to ISO 1133, and which comprises (iii) other conventional additives. The molding composition is commercially available from Ticona GmbH, 65451 Kelsterbach, Germany, as ®Hostaform C9021.

Molding composition 3 (for comparison): Composed of (i) ground polyoxymethylene copolymer whose melt volume rate (MVR) is about 12 cm$^3$/10 min to ISO 1133, and which comprises (iii) 0.4% of antioxidant (®lrganox 245 from Ciba Spezialtatenchemie GmbH), 0.05% of calcium citrate, 0.5% of melamine, and 0.6% of UV stabilizer.

Molding composition 4 (for comparison): Composed of (i) ground polyoxymethylene copolymer whose melt volume rate (MVR) is about 2.2 cm$^3$/10 min to ISO 1133, which comprises (ii) two impact modifiers: 10% of polyurethane which is composed of methylenebis(phenyl 4,4'-isocyanate), adipic acid, and 1,4-butanediol and whose tensile strain at break is 600%, and whose Shore A hardness is 83, and also 10% of thermoplastic polyester elastomer whose Shore hardness is D40 and whose melting point is 171° C., and (iii) 1.05% of other conventional additives.

TABLE

| Properties | Unit | Test method | Molding composition 1 | | Molding composition 2 | Molding composition 3 | Molding composition 4 | |
|---|---|---|---|---|---|---|---|---|
| MVR (190° C./2.16 kg) | cm³/10 min | ISO 1133 | 8 +/− 0.5 | | 8 +/− 0.5 | 12 +/− 0.5 | 1.81 +/− 0.5 | |

| | | | Injection-molded test specimen | Test specimen taken from injection-molded sheet | Rotosintered test specimen | Rotosintered test specimen | Rotosintered test specimen | Rotosintered test specimen | Injection-molded test specimen |
|---|---|---|---|---|---|---|---|---|---|
| Tensile modulus of elasticity | MPa | ISO 527 | 2123 +/− 8 | 2222 +/− 25 | 2475 +/− 26 | | 3019 +/− 56 | 1859 +/− 29 | 1701 +/− 6 |
| Yield stress | MPa | Parts 1 and 2 | 53.8 +/− 0.1 | 52.4 +/− 0.4 | | | | 42.7 +/− 0.52 | 45.3 +/− 0.2 |
| Tensile stress at break | MPa | | 47.0 +/− 2.8 | 51.1 +/− 1.7 | 52.5 +/− 0.9 | | 60.85 +/− 1.69 | 42.56 +/− 0.52 | 36.11 |
| Nom. tensile strain at break | % | | 42.4 +/− 10.2 | 20.3 +/− 9.6 | 7.1 +/− 1.1 | | 5.18 +/− 0.46 | 22.02 +/− 3.64 | 38.58 +/− 1.83 |
| (Charpy) impact resistance, 23° C. | KJ/m² | ISO 179/1 eU | 169.36 +/− 46.80 | 98.5 +/− 7.8 | 29.4 +/− 4.8 | | 19.41 +/− 4.75 | 64.61 +/− 6.96 | no fracture |
| Fracture energy | J | Penetration test ISO 6603 Part 2 | 17.06 +/− 6.87[1] | 30.13 +/− 15.83[2] | 3.47 +/− 1.01[3] | | | | 20.01 +/− 3.44 |
| Fracture deformation | mm | Penetration test ISO 6603 Part 2 | 10.24 +/− 2.37 | 10.03 +/− 2.45 | 4.56 +/− .82 | | | | 12,4211.98 +/− 1.16 |
| Density | g/cm³ | ISO 1183 | 1.3844 | | 1.3797 | | 1.41 | 1.3370 | 1.3467 |
| Ease of demolding | | | | | good: easy demolding in all cases | moderate: demolding in some cases not easy | moderate: demolding in some cases not easy | good: easy demolding in all cases | |
| Brittleness | | | | | low: all test specimens intact | high: some test specimens fracture | high: some test specimens fracture | low: all test specimens intact | |

Measured values stated as: Measured value ±3S
[1] 2 mm sheets
[2] 4 mm sheets
[3] 4.4 mm sheets

The invention claimed is:

1. A ground molding composition comprising
   a) a homogenized compounded material composed of
      i) from 60% to 99.99% by weight of at least one polyoxymethylene homo- and/or copolymer,
      ii) 0.01% to 30% by weight of an impact modifier, wherein the impact modifier is a thermoplastic polyester elastomer, wherein the thermoplastic polyester elastomer used comprises a polyetherester elastomer, wherein the thermoplastic polyester elastomer is a polyester block copolymer consisting of two segments of which one derives from an aromatic dibasic acid and from a short-chain aliphatic diol, and the other derives from an aromatic dibasic acid and from a long-chain diol, wherein the aromatic dibasic acid is dimethyl terephthalate, the short-chain diol is 1,4-butanediol, and the long-chain diol is polytetramethylene ether glycol at least one impact modifier selected from the group consisting of polyurethanes, polyesters, and combinations thereof, and
      iii) from 0 to 30% by weight of other additives selected from the group consisting of antioxidants, acid scavengers, formaldehyde scavengers, UV stabilizers, adhesion promoters, lubricants, nucleating agents, mold-release agents, fillers, reinforcing materials, antistatic agents, dyes, pigments, additives conferring electrical conductivity, and combinations thereof, which
   b) is a powder at least 90% by weight of whose particles have a grain size of <600 μm and a median grain size ($D_{50}$) of from 100 to 500 μm.

2. The molding composition as claimed in claim 1, wherein at least 95% by weight of the powder particles have a grain size of <600 μm.

3. The molding composition as claimed in claim 1, wherein at least 97% by weight of the powder particles have a grain size of <600 μm.

4. The molding composition as claimed in claim 1, wherein the median grain size ($D_{50}$) of the powder particles is from 150 to 400 μm.

5. The molding composition as claimed in claim 1, wherein the median grain size ($D_{50}$) of the powder particles is from 200 to 350 μm.

6. The molding composition as claimed in claim 5, wherein the polyoxymethylene homo- and/or copolymer has a melting point of at least 150° C. and a molecular weight (weight-average) $M_w$ in the range from 7,000 to 150,000 and the impact modifier is a polyurethane and wherein the polyurethane has a soft segment which derives from a polyhydroxy component whose average molecular weight is in the range from 500 to 5,000 and has a hard segment which derives from an aromatic diisocyanate and from a chain extender.

7. The molding composition as claimed claim 1, wherein the polyoxymethylene homo- and/or copolymer has a melting point of at least 150° C. and a molecular weight (weight-average) $M_w$ in the range from 5,000 to 200,000.

8. The molding composition as claimed in claim 1, wherein the polyoxymethylene homo- and/or copolymer has been end-group-stabilized and has methoxy end groups or C—C bonds at the chain ends.

9. The molding composition as claimed in claim 1, wherein the hardness of the thermoplastic polyester elastomer is in the range from Shore A 65 to Shore D 77.

10. The molding composition as claimed in claim 1, wherein the amount of impact modifier is from 0.2 to 20% by weight.

11. The molding composition as claimed in claim 1, wherein the amount of impact modifier is from 0.5 to 12% by weight.

12. The molding composition as claimed in claim 1, wherein the melt index (MVR 190/2.16 to ISO 1133) of the compounded material is from 1.5 to 13 $cm^3$/10 min.

13. A molding obtainable via shaping of the molding composition as claimed in claim 1.

14. The molding of claim 13 wherein the molding composition was shaped via rotomolding.

* * * * *

UNITED STATES PATENT AND TRADEMARK OFFICE
CERTIFICATE OF CORRECTION

| | | |
|---|---|---|
| PATENT NO. | : 8,008,390 B2 | |
| APPLICATION NO. | : 11/521290 | |
| DATED | : August 30, 2011 | |
| INVENTOR(S) | : Thomas Gunnewig et al. | |

It is certified that error appears in the above-identified patent and that said Letters Patent is hereby corrected as shown below:

Col. 6, Line 61 reads " ...derivaffves..." should read --...derivatives...--

Col. 11, Lines 60-62 reads "...ether glycol at lease one impact modifier selected from the froup consisteing of polyurethanes, polyesters, and combinations thereof and iii)..."; should read --...ether glycol, and iii)...--

Signed and Sealed this
Twenty-eighth Day of August, 2012

David J. Kappos
*Director of the United States Patent and Trademark Office*